United States Patent [19]

Grindle

[11] Patent Number: 4,582,401
[45] Date of Patent: Apr. 15, 1986

[54] VISUAL FIELD AND LENS OCCLUDER FOR EYEGLASSES

[76] Inventor: Mary M. Grindle, 25 Forest St., Bar Harbor, Me. 04609

[21] Appl. No.: 564,174

[22] Filed: Dec. 22, 1983

[51] Int. Cl.⁴ .......................... G02C 7/16; G02C 1/00
[52] U.S. Cl. ....................................... 351/45; 351/158
[58] Field of Search ........................ 351/44, 45, 158; 383/95; 150/120, 150; 206/5, 5.1

[56] References Cited

U.S. PATENT DOCUMENTS

| | | | |
|---|---|---|---|
| 344,147 | 6/1886 | Vom Eigen | 150/120 |
| 783,190 | 2/1905 | Gibson | 150/150 |
| 1,541,563 | 6/1925 | Graham | 383/95 X |

*Primary Examiner*—Rodney B. Bovernick
*Attorney, Agent, or Firm*—Daniel H. Kane, Jr.

[57] ABSTRACT

A visual corrective device is provided in the form of a visual field occluder or lens occluder for use with a pair of eyeglasses. A generally flat pocket-like enclosure is formed from first and second gores of a soft flexible material joined along the bottom or base portion to form an envelope enclosure. The base portion is contoured with a curvature to accommodate and generally conform to the base of a lens frame portion and lens of a pair of eyeglasses. The gores forming the envelope enclosure are open at the top for sliding the enclosure from below over a lens frame portion and lens of the eyeglasses. The enclosure is constructed and arranged with side openings in the form of first and second notches between the gores extending downward from the top of the gores and meeting the joined base of the enclosure. The notches are asymmetrical and the first notch extends to a lesser depth between the gores for receiving the higher of the inside bridge between the lens frame portions of the pair of eyeglasses or spectacles and an outside bow. The second or outer notch extends to a greater depth than the first notch for receiving and accommodating the lower of the inside bridge and an outside bow of the pair of eyeglasses. The visual field occluder and eyeglass lens enclosure may be fitted over either the right or left lens frame portion and lens by inverting the enclosure right to left or left to right. A closure at the top of the gores secures the enclosures in position and provides ready removal and replacement for washing, inverting, etc. The field of view of one eye of a wearer of the pair of eyeglasses or spectacles is occluded by the covered lens thereby deferring to the weaker eye and constraining the wearer to exercise greater use of the weaker eye through the field of view of the unoccluded lens.

9 Claims, 4 Drawing Figures

U.S. Patent  Apr. 15, 1986  Sheet 1 of 2  4,582,401
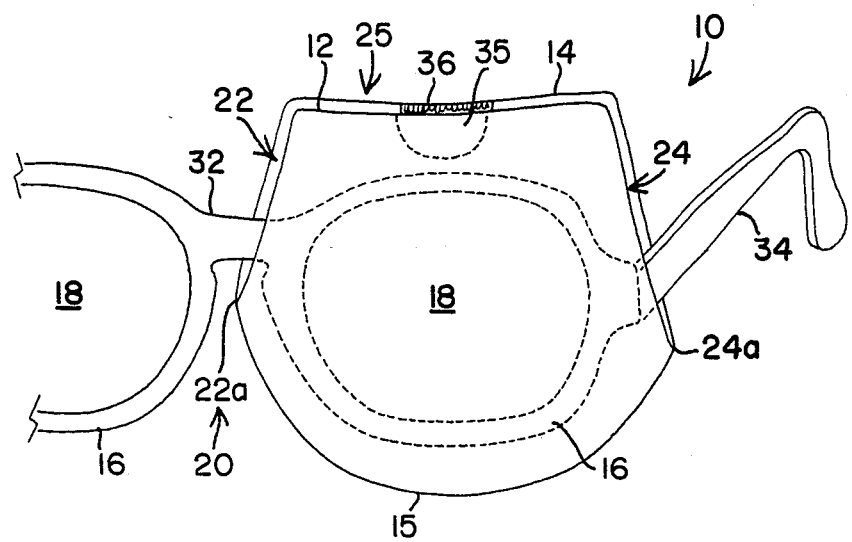
FIG 1
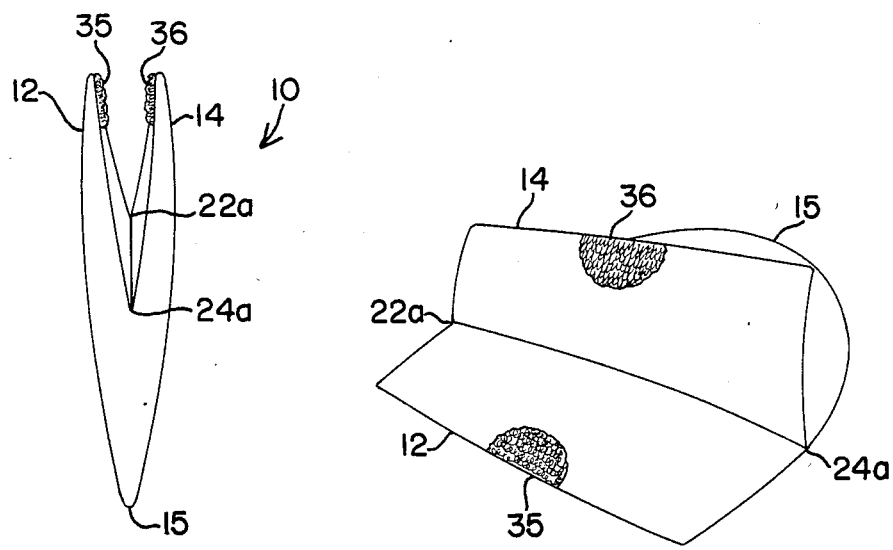
FIG 2
FIG 3

VISUAL FIELD AND LENS OCCLUDER FOR EYEGLASSES

TECHNICAL FIELD

This invention relates to a new corrective visual device and in particular a lens occluder or visual field occluder for occluding or blocking the field of view of one eye through the lens frame portion and lens of a pair of eyeglasses or spectacles thereby constraining the wearer to exercise greater use of the other eye through the field of view of the unoccluded or uncovered lens. The invention is particularly useful in the treatment of strabismus, amblyopia, anopsia, eye "squint", and similar problems of unbalanced eye musculature by discouraging use of the stronger eye whose visual field is occluded and promoting use and exercise of the eye muscles of the weaker eye with a clear field of view through the uncovered lens of the pair of eyeglasses or spectacles.

BACKGROUND ART

Problems of unbalanced eye musculature, eye pull and related defects are presently treated in young children by adhesively securing a patch over the stronger eye to promote use and exercise of the eye muscles of the weaker eye. Such deficiencies associated with strabismus, anopsia, and amblyopia are most effectively treated between the ages of three and seven. If the eye problem is detected after the age of seven, treatment by occlusion of the stronger eye is generally not effective and cosmetic surgery is necessary for any correction of the weak eye muscle problem. Even this may not improve the child's vision, however. As a result, for treatment of strabismus, amblyopia, anopsia, eye "squint", and unbalanced eye musculature, the presently available adhesive eye patches must be used on young children. The adhesive patch is extremely irritating for many children and may cause allergic rashes and a generally unhealthy closed environment over the eye. There is a tendency for the child to pull on the patch and remove the patch, particularly during crying episodes. The conventional adhesive occluder patch is not reusable and is not easily removable and replaceable and is particularly unsuitable for small children, the patients for whom the treatment is frequently used.

U.S. Pat. No. 893,972 for an eye guard and shield for spectacles, U.S. Pat. No. 2,895,376 for occluders for spectacle attachment, and U.S. Pat. No. 2,172,573 for an eyeshield describe eye patches, shields, guards, or occluders which fit directly over the eye of the user and are secondarily supported by a pair of eyeglasses or spectacles. These devices do not fit directly over the lens frame portion and lens of a pair of eyeglasses or spectacles. Rather, they are supported only incidentally and externally by the spectacles and are intended to contact or fit directly over the eye of the wearer.

OBJECTS OF THE INVENTION

It is therefore an object of the present invention to provide a new visual field occluder and lens occluder which effectively treats unbalanced eye musculature and similar diseases and defects without adhesive contact with the child's face and without the accompanying irritation.

Another object of the invention is to provide a corrective visual device in the form of a visual field occluder or lens occluder which is easily removable and replaceable by a young child and which can be easily handled by a small child without special requirements for fitting, placement, etc.

A further object of the invention is to provide a corrective visual device for occluding the visual field of one eye, which is reusable, easy to clean, sanitary, and non-allergenic.

The invention is intended for use on a pair of eyeglasses or spectacles, reversible for covering either the right or left lens. The visual field occluder according to the invention is inexpensive, durable, and long lasting.

DISCLOSURE OF THE INVENTION

In order to accomplish these results the invention provides a visual corrective device in the form of a visual field occluder or lens occluder for use with a pair of eyeglasses of the type having a frame formed with a bridge joining lens frame portions in which the lenses are seated and bows on either side for supporting the pair of eyeglasses. According to the invention a generally flat pocket-like enclosure is formed from first and second gores of a soft flexible material joined along the bottom or base portion to form the enclosure. The base portion is contoured with a curvature to accommodate and generally conform to the base of a lens frame portion and lens of a pair of eyeglasses.

The invention further provides that the gores forming the enclosure are open at the top for sliding the enclosure from below over a lens frame portion and lens of a pair of eyeglasses. The enclosure is constructed and arranged with side openings in the form of first and second notches between the gores extending downward from the top of the gores and meeting the joined base portion of the enclosure. Because most eyeglasses are constructed with the inside bridge between lens frame portions and lenses at a different level on the frame from the outside bows which support the pair of eyeglasses, the notches are asymmetrical. The first notch extends to a first depth between the gores of the enclosure for receiving the higher of the inside bridge of the pair of eyeglasses or spectacles and an outside bow. The second notch extends to a second depth greater than the first notch and first depth for accommodating the lower of the inside bridge or outside bow of the pair of eyeglasses.

The curved base portion therefore follows the contour of the cheek bone and face without unnecessary contact while the top of the gores of the enclosure may extend above the frame of the pair of eyeglasses where unnecessary contact with the skin does not occur.

A feature and advantage of the visual field occluder and eyeglass lens enclosure according to the invention is that the enclosure may be fitted over either the right or left lens frame portion and lens of a pair of eyeglasses or spectacles by inverting the enclosure right to left or left to right so that the first notch of lesser depth always receives and accommodates the higher of the bridge of the frame of the spectacles or the bows.

The invention contemplates that the enclosure is formed with a closure arrangement at the top of the gores for securing the enclosure in position over a lens frame portion and lens without sliding off during play or movement by the young child. The closure element or arrangement at the top of the gores may be, for example, a "Velcro" (TM) type closure of a flexible or fabric-like material. A feature and advantage of this arrangement is that the entire visual field and lens occluder is constructed of soft fabric material supported on the lens frame portion and lens itself without irritation to the skin or face of the young child.

The field of view of one eye of a wearer of the pair of eyeglasses or spectacles is occluded by the covered lens thereby deferring to the weaker eye and constraining the wearer to exercise greater use of the weaker eye through the field of view of the unoccluded lens.

Other objects, features, and advantages of the invention will become apparent in the following specification and accompanying drawings.

BRIEF DESCRIPTION OF THE DRAWINGS

FIG. 1 is a perspective view of a fragmentary portion of a pair of eyeglasses or spectacles showing a visual field or lens occluder according to the invention in operative position over one of the lens frame portions and lenses of the pair of eyeglasses with the closure secured at the top of the flat, pocket-like enclosure.

FIG. 2 is a side view of the visual field and lens occluder with the top of the gores partially spread and opened.

FIG. 3 is a perspective view of the eyeglass lens occluder showing one of the gores or flaps folded back showing the construction of the enclosure.

DESCRIPTION OF PREFERRED EXAMPLE EMBODIMENT AND BEST MODE OF THE INVENTION

Figure 4:
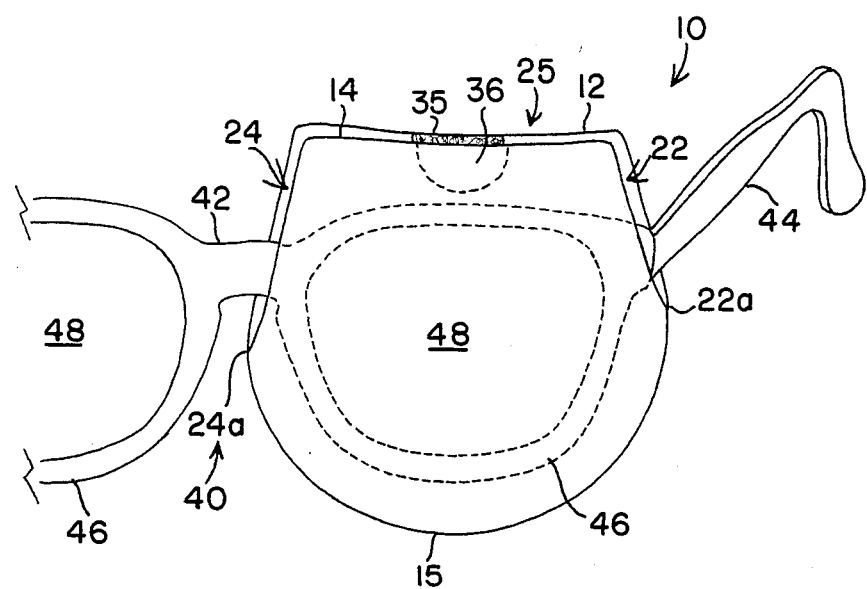
FIG. 4 is a perspective view of the visual field and lens occluder in operative position over another pair of eyeglasses in which the outside bows are at a higher level on the frame than the inside bridge.

In the preferred embodiment of the present invention illustrated in FIGS. 1 thru 3, the visual field and lens occluder is in the form of a flat pocket-like enclosure 10 formed by first and second gores of cloth 12 and 14 joined along the bottom or base portion 15, for example using a seam, to form the envelope or pocket-like enclosure. The base portion 10 is contoured with a curvature to accommodate and generally conform to the base of a lens frame portion 16 and lens 18 of a pair of eyeglasses 20.

The pocket-like envelope or enclosure 10 is formed with side openings 22 and 24 which form notches between the gores 12 and 14 extending downward from the top 25 of the gores and meeting the joined base portion or seam 15 of the enclosure. The first notch 22 extends to a first depth 22a between the gores 12 and 14 of the enclosure 10 for receiving the bridge 32 between the lens frame portions and lenses 18 of the pair of eyeglasses 20. The second notch 24 extends to a second depth 24a greater than the first notch 22 and first depth 22a for accommodating an outside bow 34 of the pair of the eyeglasses 20. In this example, a common construction is shown for the pair of eyeglasses 20 in which the top of the bridge 32 is higher on the frame than the outside bows 34 which extend from the outer sides of the lens frame portions and lenses 18.

The open top 25 of the gores 12 and 14 is formed with a generally straight edge along the top with notches 22 and 24 forming angled sides meeting the base 15 of the enclosure 10 where the gores 12 and 14 are joined by the seam along the base portion 15. Thus, the notches 22 and 24 comprise the angled sides in which are seated respectively the bridge 32 and bow 34. The angled sides of the preferred embodiment facilitate handling and placement of the envelope over a lens frame portion and lens.

The enclosure 10 may be fitted over either the right or left lens frame portions and lenses 18 by inverting or reversing the enclosure from left to right or right to left. The notch 22 having the lesser depth 22a is always on the inside for receiving the bridge 32 of the frame of the pair of eyeglasses or spectacles 10. The notch 24, on the other hand, is always on the outside for receiving and accommodating a bow 34 of the frame of the pair of eyeglasses 20.

The enclosure 10 is also formed with a closing mechanism or closure along the topped 25 of the gores 12 and 14 for securing the pocket-like envelope or enclosure 10 in position over a lens frame portion and lens. In the preferred example of FIGS. 1 thru 3 a "Velcro" (TM) type closure is used with a first patch 35 of a multitude of flexible hook elements on the inside of gore 12 and a second patch 36 of a multitude of flexible loop elements on the other gore 14. While a variety of other closure means or mechanisms may be used, such as for example snaps, etc., a feature and advantage of the "Velcro" (TM) type closure is that the visual field and lens occluder envelope or enclosure may be manufactured entirely of soft cloth or flexible material to avoid irritation of the skin of a young child.

The visual field and lens occluder 10 is shown in operative position on another type of eyeglass frame construction in FIG. 4. In this type of construction the outside bows 44 extend from the top at the outside of the lens frame portions 46 and lenses 48 at a level on the frame which is actually higher than the inside bridge 42. For application of the invention on eyeglasses 40 of this type of construction the pocket-like envelope or enclosure 10 is of course inverted with the shallower notch 22 of lesser depth 22a always on the outside to receive the bow 44, and the deeper notch 24 of greater depth 24a on the inside to accommodate the bridge 42. In the example of FIG. 4, all reference numerals on the envelope or enclosure 10 are the same as in FIG. 1 but of course with the envelope inverted right to left. In an instance where the inside bridges and outside bows are at same level on the frame, either right or left orientation may be used. However, where the inside bridge and outside bows are asymmetrically placed at different levels of the frame as in the major types of eyeglass construction, the asymmetrical notch construction of the present invention provides a close fit over the lens frame portion and lens without displacement or movement during use.

The pocket-like envelope or enclosure is made, for example, of a smooth soft material such as muslin, felt, or other similar cloth material. The envelope enclosure may be constructed in a variety of sizes and colors and may be joined along the base portion, for example, by a blind stitch seam or other seam.

For example, the envelope enclosure may be formed from gores of light colored muslin permitting translucent passage of light to the blocked eye. Multiple layers may be used to adjust the degree of translucence and the weight of the enclosure. A lightweight envelope enclosure may be formed, for example, of three layers or gores of muslin-two at the front or back, and one on the opposite side. Alternatively an opaque material such as black felt may be used if more acceptable to the requirements of a particular child or particular situation.

The visual field and lens occluder would normally be used according to a schedule recommended by the opthalmologist. For example, the envelope enclosure may be placed and worn on the lens frame portion and lens over the stronger right eye for five days, followed by a rest with both visual fields open, followed by three days over the stronger right eye and then two days over the weaker left eye, followed by two days of rest without occlusion of either visual field. Or, typically another schedule would be alternating one day wearing the envelope enclosure on the lens frame portion and lens over the stronger eye followed by one day open on both visual fields. Thus, according to this latter schedule, the occluder is used only over the stronger eye but alternating one day on and one day off.

The invention provides a healthful and safe visual field or lens occluder which when used with a pair of eyeglasses or spectacles permits light and air to enter around the sides maintaining a healthful environment for the young child's eye. There is no irritating or allergenic adhesive contact with the skin or eyebrow and no obstruction of circulation in the skin. On the other hand, the envelope enclosure provides a safe and healthful method of treatment for promoting use of the weaker eye while at the same time it is easily handled and easily removable and replaceable as may be necessary by a small child.

While the invention has been described with reference to the particular preferred example embodiment, it is intended to cover all variations and equivalents within the scope of the following claims.

I claim:

1. A corrective visual device for treatment of strabismus and similar problems of unbalanced eye musculature by discouragiing use of the stronger eye and promoting use and exercise of the eye muscles of the weaker eye, said corrective visual device being used with a pair of eyeglasses having a frame formed with an inside bridge joining lens frame portions in which the lenses are seated and outside bows on either side for supporting the pair of eyeglasses, comprising:

a visual field and lens occluder comprising a generally flat pocket-like enclosure constructed and arranged for occluding or blocking the field of view of one eye through one lens frame portion and lens of a pair of eyeglasses without irritating contact by the occluder with the skin or face of the wearer, said pocket-like enclosure comprising first and second gores of soft flexible material joined along the bottom or base portion of form said enclosure, said base portion contoured with a curvature to accommodate and generally conform to the base of a lens frame portion and lens of a pair of eyeglasses, said enclosure formed with the gores open at the top for sliding the enclosure from below over a lens frame portion and lens of a pair of eyeglasses, said enclosure formed with side openings comprising first and second notches between the gores extending downward from the top of the gores and meeting the joined base portion of the enclosure, said first notch extending to a first depth between the gores of the enclosure for receiving the higher of the inside bridge between the lens frame portions and lenses of a pair of eyeglasses and the outside bows, said second notch extending to a second depth greater than the first notch and first depth for accommodating the lower of the inside bridge and an outside bow of the pair of eyeglasses whereby said enclosure may be fitted over either the right or left lens frame portions and lenses of a pair of eyeglasses by inverting the enclosure right and left so that the first notch of lesser first depth is always on the side for receiving and accommodating the lower of the inside bridge and the outside bows of the frame of a pair of eyeglasses, said enclosure formed with closure means at the top of the gores for securing the enclosure in position over a lens frame portion and lens of a pair of eyeglasses so that the field of view of one eye of a wearer through said covered lens is occluded thereby constraining the wearer to exercise greater use of the other eye through the field of view of the unoccluded lens.

2. The visual field and lens occluder of claim 1 wherein the closure means at the open top of the gores of the enclosure comprises complementary fabric closure means comprising a first patch of a multitude of flexible hook means on the inside of one gore and a second patch of a multitude of flexible loop means on the other gore.

3. The visual field and lens occluder of claim 1 wherein said closure means comprises snap means.

4. The visual field lens occluder of claim 1 wherein the enclosure is comprised of first and second gores of soft cloth material.

5. The visual field and lens occluder of claim 1 wherein the enclosure is formed at the open top of the gores with a generally straight edge along the top with angled sides meeting the base of the enclosure where the gores are joined, said first and second notches formed in the angled sides.

6. The visual field and lens occluder of claim 4 wherein the enclosure comprises first and second gores of soft translucent cloth material.

7. The visual field and lens occluder of claim 6 wherein the enclosure comprises a plurality of gores of soft translucent cloth material combined to provide multiple layers of the gores of soft cloth material at least on the front or back of the enclosure.

8. The visual field and lens occluder of claim 4 wherein the soft cloth material comprises muslin.

9. The visual field and lens occluder of claim 4 wherein the soft cloth material comprises felt.

* * * * *